United States Patent [19]

Koukol

[11] 3,990,312

[45] Nov. 9, 1976

[54] APPARATUS FOR CONTAMINATION-FREE TRANSFER OF A SERIES OF LIQUID SAMPLES IN PRECISELY MEASURED VOLUME

[75] Inventor: Hubert Koukol, Bad Nauheim, Germany

[73] Assignee: W. C. Heraeus GmbH, Hanau, Germany

[22] Filed: Sept. 30, 1975

[21] Appl. No.: 617,999

[30] Foreign Application Priority Data

Oct. 10, 1974 Germany ............................ 2448353

[52] U.S. Cl. ............................... 73/423 R; 73/425.6

[51] Int. Cl.$^{2}$ ......................... G01N 1/14; B01L 3/02

[58] Field of Search ........... 73/421 R, 423 A, 425.6; 222/148; 23/292, 259

[56] References Cited

UNITED STATES PATENTS

| | | | |
|---|---|---|---|
| 3,273,402 | 9/1966 | Farr | 73/425.6 |
| 3,827,304 | 8/1974 | D'Autry | 73/425.6 |
| 3,877,310 | 4/1975 | Pecsar | 73/425.6 |

*Primary Examiner*—S. Clement Swisher
*Attorney, Agent, or Firm*—William R. Woodward

[57] ABSTRACT

A valve ahead of a continuously running exhaust pump allows air to be sucked through the piping of a burette from the intake capillary and, after the capillary is lowered into the input sample vessel, a quantity of the sample liquid flushes out any remaining traces of a previous sample. After the necessary small quantity of the sample liquid has been thus pulled into and out of the burette, the valve is closed and a piston with a conical head fitting right into the burette draws in a measured quantity of the sample from the input container and then discharges it into the output container. The vertex of the piston is flattened so that the channel through the burette head will not be closed off when the piston is driven all the way into the burette head.

6 Claims, 2 Drawing Figures

Figure 1:
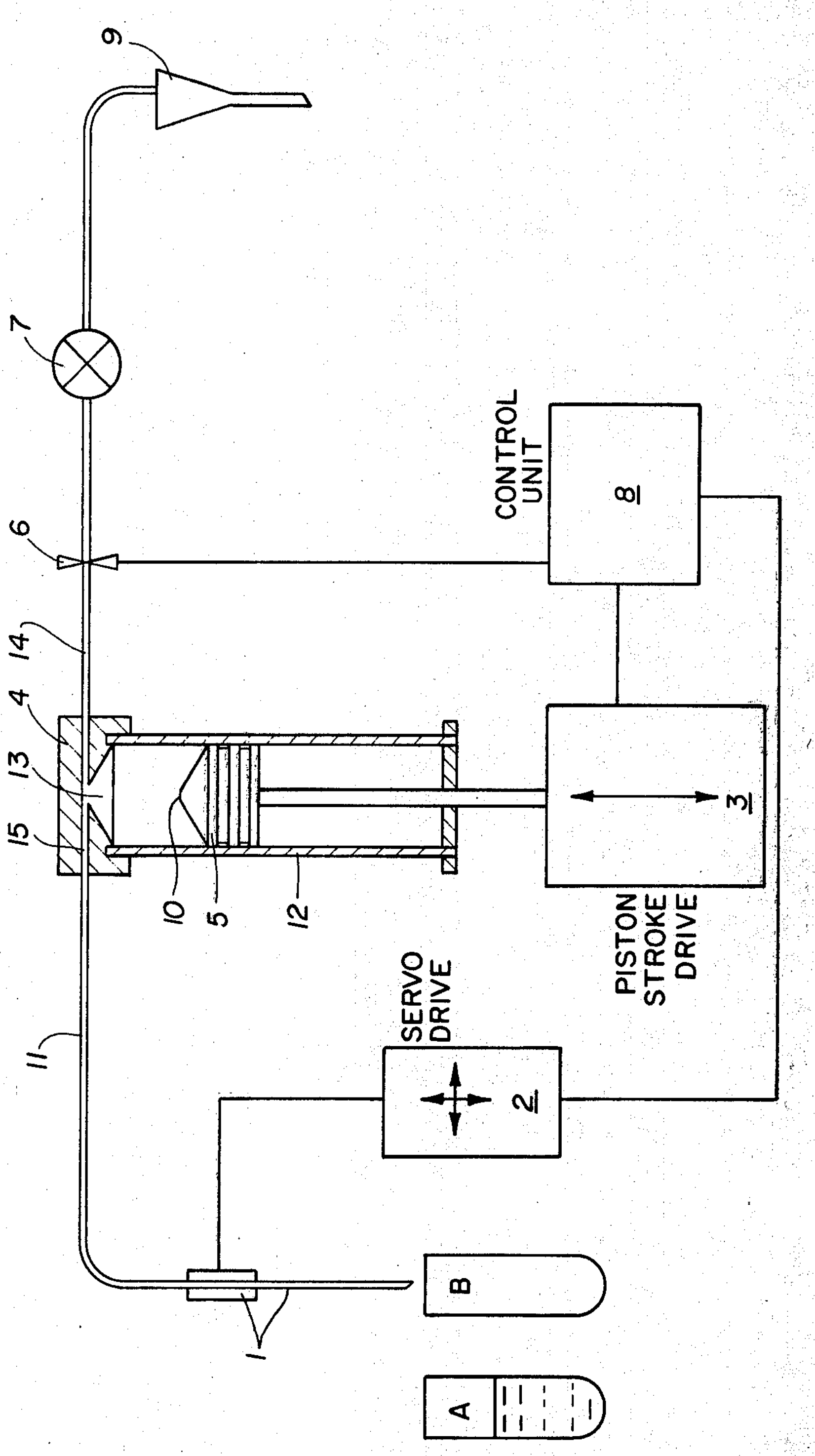

APPARATUS FOR CONTAMINATION-FREE TRANSFER OF A SERIES OF LIQUID SAMPLES IN PRECISELY MEASURED VOLUME

This invention relates to automatic contamination-free transfer of various liquid samples from one vessel to another in precise volumes in a pipetting device in a manner in which the measured quantity of sample liquid is not contaminated by a previously transferred sample or by any flushing liquid. The measured volumes to be transferred may extend for example from 0.5 to about 100 ml.

In chemical laboratories, it is common to carry out titration after first washing out the burette with the liquid to be used for titration. Automatic pipetting devices are also known, such as those which consist of two automatic burettes. These are first both filled with a flushing liquid, and then one of them serves as the sample burette for measuring the precise sample to be measured or treated and the other is designated for use as a dilution burette. In their use the sample is merely sucked into the input tube of the sample burette and then driven out of that tube into another sample vessel after which the tube is cleaned with the flushing liquid that is let out thereafter from the dilution burette. In this procedure the volume of sample sucked up may not be greater than the capacity of the suction tube, for if the sample penetrates into the sample burette, contamination errors arise. Such pipetting devices on the one hand can transfer only small sample volumes (less than 0.5 ml) and, on the other hand, the sample is mixed with another liquid (compare for example German Published patent applications (OS) Nos. 1,673,350, 2,257,558, and 1,498,960). This last may cause substantial errors in the subsequent determination of physical properties of the sample (for example density, or index of refraction).

There are also pipetting devices known which suck up the sample from a container connected to the intake tube and then let it run out into a new sample vessel. Thereafter, the container is cleaned by a dash of flushing liquid and dried with a gas stream, or else the contaminated container is manually exchanged (compare in this connection German published patent application (OS) No. 2,132,066). Both of these methods are inconvenient and unsuitable for the fast operating characteristic of an automatic device.

It is an object of the invention to provide a pipetting device in which larger quantities (more than 0.5 ml) of various different samples can automatically be transferred from one sample container to another and in which the cleaning of the system takes place with the next used sample liquid itself, in such a way that the used-up portion of the sample for this cleaning process is at a minimum and the amount of contamination remains below the detection threshold of the analysis that follows.

SUMMARY OF THE INVENTION.

Briefly, the head of an automatic burette has a cavity accomodating a piston so built into it that the combined unit has no dead volume and is constituted, moreover, of a material which is not wetted by the sample liquids with which it is to be used, typically a synthetic resin material, so that in the final operation the sample can be fully expelled from the burette.

The head of the burette advantageously has two connecting tubes that are so arranged that their portions near the head of the burette lie in a straight line with a bore going through the burette head, thus providing a continuous channel without corners or bends. The piston of the burette is so formed that it has a vertex which would project into this channel, but is flattened down enough so that the channel cannot be closed by the piston. One of the connecting tubes leads to an intake capillary and the other is provided with a valve and also leads to a pumping device.

With such an arrangement the result is obtained that the tubing system is flushed in only one direction (towards the pump) by the succeeding sample and that the measured-out amount of the sample that is taken up after this first flushing, is discharged again through the intake capillary, into another containing vessel. In this way the using up of the sample material for flushing is substantially reduced.

Figure 2:
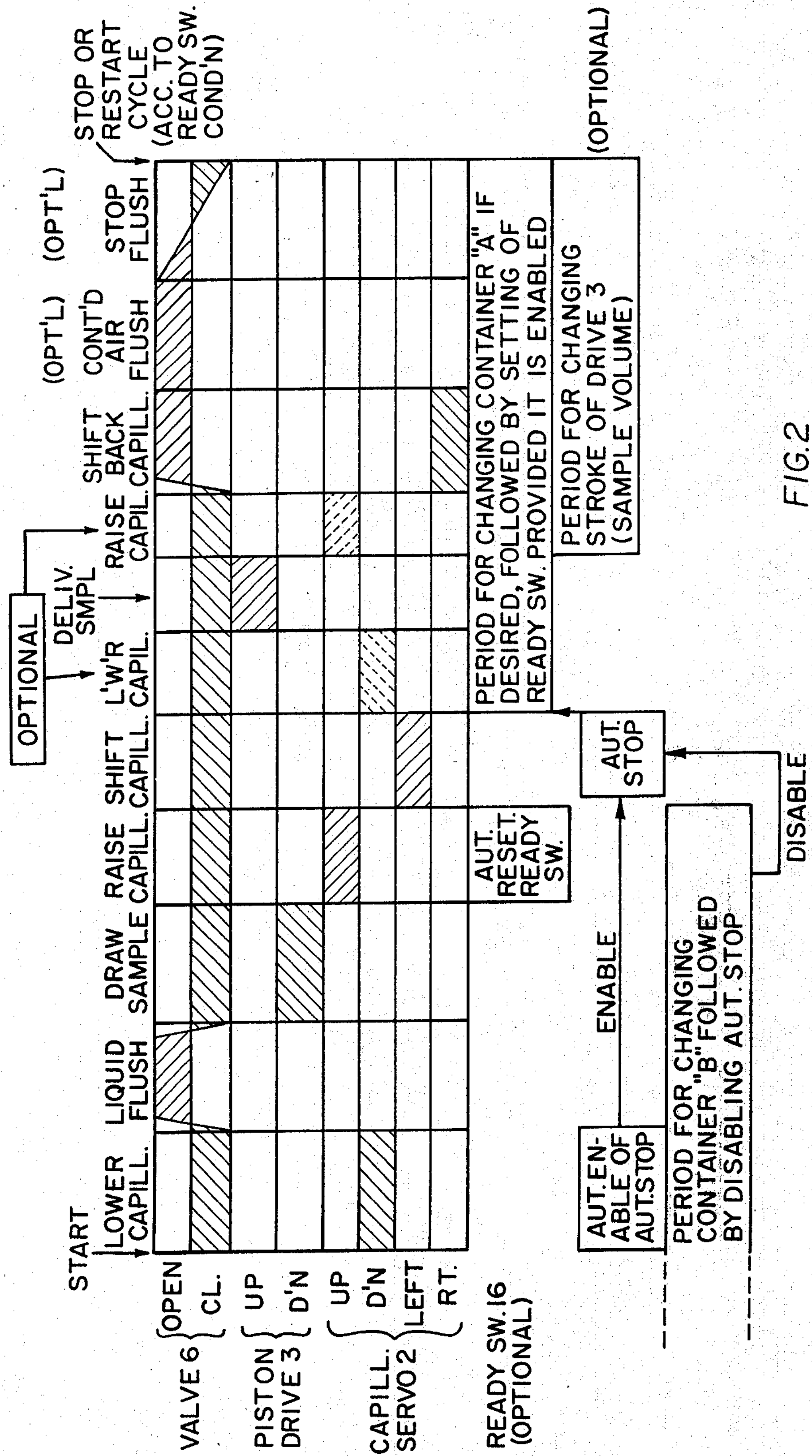

The invention is further described by way of example with reference to the annexed drawing in which:

FIG. 1 shows an apparatus according to the invention in rather schematic fashion, and FIG. 2 is a sequencing diagram for the control circuit of FIG. 1.

The illustrated embodiment has the following components and features;

- intake capillary 1,
- raising and lowering mechanism 2 for the capillary,
- automatic burette drive 3,
- burette consisting of cylinder 12, cylinder head 4, with conically faced piston 5 fitting in the cylinder 12 with its conical face for fitting into the cavity 13 of cylinder head 4,
- valve 6,
- pump 7,
- discharge control 8 for the system,
- discharge funnel 9,
- flattening 10 of the piston vertex (parallel to the bore 15),
- conduit 11, burette cylinder 12 (already mentioned),
- conical cavity 13 in burette cylinder head 4 to nest the conical face of piston 5 in its upper position,
- conduit 14 to valve and to pump, bore 15 through the burette cylinder head 4 transverse to axis of burette cylinder 12 and passing through vertex of the cone of cavity 13 and;
- next-sample-ready switch 16.

MANNER OF OPERATION:

The purpose of the operation is to transfer a predetermined exact quantity of a sample liquid from the container A into the container B. The transfer system is at first in its starting condition, described as follows: Piston 5 is in its upper dead center position against a stopping or seating surface fitting the piston head and the vertex of its conical surface projects into the cross passage of the burette cylinder head 4, but as the result of the flattening 10 at the vertex, the bore 15, which has a diameter of about 1 mm and passes diametrically completely through the burette cylinder head, is not closed off by the piston.

Upon starting, the raising and lowering mechanism 2 dips the intake capillary 1 into the sample held in container A. The magnetic valve 6 is then set in the position for "suction". The tube pump 7 runs uninterruptedly. After the valve 6 opens, the tube 11 is cleared of the contamination by the previous sample. After a predetermined quantity of the sample needed for the cleaning of the tubing system has flowed through the apparatus (this sample quantity can be controlled in terms of the throughput of the tube pump and the open time of the magnetic valve), the valve 6 closes and the command for "sample take-up" is then provided by the electric or electronic control 8 to the automatic burette drive 3, which produces movement of the piston 5 downwards for a stroke length that is calculated to take up by suction a desired volume of liquid. For this purpose the piston may be controlled, for example, by an electric stepping motor (not shown) operated by pulses provided by digital electronic control circuits in the control unit 8.

After the piston 5 has reached the predetermined lower position (and has thereby taken up the desired volume into the cylinder of the burette), the burette drive is stopped, the raising and lowering device 2 transfers the intake capillary to the container B and, finally, the control unit 8 provides the command for emptying the burette. The entire volume of liquid present in the burette cylinder is driven out of the cylinder 12, so that finally the piston 5 is again at its dead center stop in the burette cylinder head 4, by operation of the burette drive 3 that moves the piston up and down. In consequence, the precise sample volume is delivered to the container B, having originally come from the container A. Thereafter, the intake capillary 1 is again lifted up into the starting position, the valve 6 set for suction (opened), and air is sucked into the tube 11. The apparatus is then brought back into the starting condition and the transfer of a new sample can now begin.

The raising and lowering device 2 consists preferably of a rod connected through a lever with the capillary 1 and driven hydraulically, pneumatically and/or electromagnetically. This rod and lever mechanism is both vertically and horizontally displaceable, as indicated by arrows in the symbolic block 2. This displacement movement is produced by the control unit 8 by operation of known electronic circuits utilizing known components, such as switches, relays, magnets, valves or the like in turn controlling mechanical movement. The nature of such control circuits is well enough known in the art of servo mechanisms, particularly programmed cycle servo mechanism. Limit switches (not shown), for example, may be used in the conventional way to define the positions over the containers A and B at which a servo motor stops the horizontal transport of the capillary 1, and likewise to define the top and bottom of the vertical travel of the tip of the capillary 1.

The "sample ready" switch 16 may be manually operated by an attendant who puts a new sample in position while a previous sample is being delivered or while the apparatus is being flushed with air, or it may be automatically operated, as for example when the successive samples are presented on a turret that advances one step as soon as the burette has finished drawing up a measured sample for transfer. The switch 16 is, of course, not necessary as for example when there is a start switch (not shown) that must be actuated or tripped to begin each cycle.

FIG. 2 is a sequencing diagram for the control circuit 8. Where large samples are measured, the control circuit and its sequencing switch can be one of the many kinds used in automatic appliances, with cams, relays, etc., but for small samples electronic sequencing and switching is desirable because of the higher speed of operation. Even the slowest electronic microprocessor controls are fast enough for controlling the motors (e.g. stepping motors, valve, etc.) of the present apparatus.

The tabular sequencing diagram shown in FIG. 2 is self-explanatory, but some further remarks regarding the options and regarding the protective interlock arrangements diagrammed are in order. The operations of lowering the capillary preceding the delivery of the sample and raising it thereafter are indicated as optional, both by the label "optional" above the table and by the dashed shading of the squares relating to the particular drives, because for the handling of certain liquids it may be unnecessary to lower the capillary into the vessel B in order to deliver the sample. Where there is no danger that the liquid will splash from being so delivered, the operation may be speeded up by not lowering the capillary into the container B.

The valve 6 is shown as opening at the beginning of the return horizontal movement of the capillary and, of course, if the time taken by this movement is sufficient to flush the tubing 14 and the burette bore 15, it is not necessary to have the next step indicated on FIG. 2 that is labelled "continued air flush". Furthermore, it is not strictly necessary to have a stop flush operation at the end of the cycle, but it is noted that if the liquid level in container A is not always the same, having the valve 6 open during the operation of lowering the capillary would result in variation in the amount of sample liquid used up in the liquid flush. Since it is one of the advantages of the invention that the amount of sample liquid used at this stage can be kept to a minimum, the valve 6 is shown as closed during the first step in which the capillary is lowered, and that necessitates the provision of the stop flush operation at the end of the cycle. The slope of the diagonal line showing the change of condition of the valve 6 during the stop flush cycle illustrates that the time scale in the sequencing diagram is non-uniform in order to simplify illustration and obviously the speed of the closing of the valve 6 would normally be the same at the end of the air flush as at the end of the liquid flush which is the second step. The other openings and closings of the valve 6 are not indicated as separate steps, that having been done only in the last step to indicate the option just mentioned and to indicate also that the option of the continued air flush and the option of not closing the valve are independent.

At the bottom of the diagram are shown the periods available for changing the container A, for changing the container B and for changing the stroke of the drive 3 (changing the sample volume setting). It may not be desired to change the container A after every cycle if more than one sample of the same sample liquid is to be measured out and of course changing of the sample size would not be expected for every cycle. In manual operation changing the sample size would more likely be done between intermittent cycles, but the control system 8 could automatically set the sample size for each cycle from instructions on a control tape while one cycle of the apparatus follows the other without interruption by utilizing the period for changing the stroke of drive 3, as indicated on FIG. 2.

The ready switch 16, as evident from the logic stated on FIG. 2, is an optional device for indicating that the container B has been changed and that the container A either has been changed or does not need to be changed, and if it has not been operated to its "set" condition either manually or automatically by the end of the cycle, the cycle will stop instead of restarting.

The ready switch is automatically reset to its "unset" condition after the drawing up of the sample has been completed as shown in the fourth column of the sequence diagram, so that it must be set again in order to substitute a restart order for a stop order at the end of the cycle.

If the container B can be changed fast enough so that the change is completed during the air flush at the end of the cycle, a single operation, putting the ready switch in its set condition after the container B has been changed and also, if necessary, the container A, can be performed before the end of the cycle to let the machine go on without stopping at the end of the cycle. In FIG. 2, however, a sequence of operation taking advantage of the time during which the apparatus is working with the container A for completing the changing of the container B is shown.

Since presumably the container B is changed after every sample, an automatic stop operation must be enabled and disabled in every cycle during continuous cycling of the machine and for this reason it is preferably built into the control system 8 and is therefore not indicated separately in FIG. 1 like the ready switch 16.

The invention is particularly well suited for chemical and/or physical analysis in the field of food chemistry and in conducting tests or testing or investigating beverages.

Although the invention has been described with reference to a particular illustrative embodiment, it will be understood that variations and modifications are possible within the inventive concept.

I claim:

1. Apparatus for contamination-free transfer of liquid samples of predetermined volume in the range between 0.5 and about 100 ml, comprising:

a burette having a cylinder (12), a cylinder head (4) and a piston (5) in said cylinder, said cylinder head having a channel (15) passing therethrough substantially transversely with respect to the axis of said burette cylinder, the interior of said cylinder communicating directly with said channel (15) at an apex region of a cavity (14) in said cylinder head terminating the space enclosed by said cylinder and said piston having a piston head face shaped to conform with said cavity and being movable axially in said cylinder, to and from a position in which there is substantially no space for occupation by liquid between said channel and said piston;

first tubular conduit means (11) connected with one end of said channel (15) of said burette cylinder head (4) for transferring liquid from a vessel (A) to said burette cylinder head and from said burette cylinder head back to another vessel (B), and second tubular conduit means (14) connected to the other end of said channel (15) of said burette cylinder head (4) and having a pump (7) interposed therein, for transferring liquid by suction from said burette cylinder head to a disposal orifice, said burette cylinder head (4) and said first conduit means (11) being constituted of a material substantially not wetted by the sample liquids with which the apparatus is to be used, whereby a portion of one sample liquid can be sucked through said first conduit means (11) and said burette cylinder head (4) to remove any remainder of a previously used sample liquid and then an uncontaminated portion measured by movement of said piston in said cylinder can be drawn into the apparatus and thereafter transferred to another vessel without the necessity of using a flushing fluid, and thereafter the remaining portion of the sample fluid in the apparatus can be fully driven out of the burette and said first conduit by said pump by allowing air to be sucked into said first conduit thereby.

2. Apparatus as defined in claim 1, in which the piston head of said piston (5) has a conical face and the burette cylinder head (4) has a correspondingly shapped cavity (13) into which said piston fits in one end position.

3. Apparatus as defined in claim 2, in which said channel (15) is a substantially straight channel through said burette cylinder head (4) and said first and second conduit means (11, 14), in substantial portions thereof, form straight extensions of said channel (15).

4. Apparatus as defined in claim 3, in which said first conduit means is connected with an intake capillary tube (1) and said second conduit means (14) is provided with a control valve (6) between said burette cylinder head (4) and said pump (7), whereby said pump may be operated continuously and the burette operation can be controlled by said valve.

5. Apparatus as defined in claim 2, in which said piston is so shaped and said channel so disposed that when said piston is fully seated in said cavity of said burette head, said channel (15) in said burette cylinder head (4) is still left open, although said piston in said position fills the entire portion of said cylinder adjacent to said channel and also the access aperture between said channel and said cylinder.

6. Apparatus as defined in claim 4, in which means are provided for relative movement of said intake capillary tube and said vessels, and in which means are provided for controlling operation of said valve and relative movement of said intake capillary tube and said vessels and for controlling axial movement of said pistion in said cylinder and for sequencing said movements in the following sequence: approach of said intake capillary tube into a first one of said vessels, opening said valve for a period and closing it for liquid flush, a stroke of said piston away from its end position against the burette cylinder head, movement of said capillary tube out of said first vessel and into position for discharge into a second one of said vessels, a return stroke of said piston to its position against said burette cylinder head, movement of said capillary tube to a position above said first vessel concurrent with opening said valve for a period of air flush, and closure of said valve after an adequate air flush and before a new cycle of operation.

* * * * *